(12) United States Patent
Lyakh et al.

(10) Patent No.: US 8,359,513 B2
(45) Date of Patent: Jan. 22, 2013

(54) DATA COMMUNICATIONS METHODS AND APPARATUS

(75) Inventors: Mikhail Yurievich Lyakh, St. Petersburg (RU); Konstantin Vladimirovich Zakharchenko, Dnepropetrovsk Region (UA); Oleg Borisovich Semenov, St. Petersburg (RU)

(73) Assignee: Intel Corporation, Santa Clara, CA (US)

( * ) Notice: Subject to any disclaimer, the term of this patent is extended or adjusted under 35 U.S.C. 154(b) by 1490 days.

(21) Appl. No.: 11/814,094

(22) PCT Filed: Jan. 19, 2005

(86) PCT No.: PCT/RU2005/000016
§ 371 (c)(1),
(2), (4) Date: Jul. 17, 2007

(87) PCT Pub. No.: WO2006/078183
PCT Pub. Date: Jul. 27, 2006

(65) Prior Publication Data
US 2008/0104485 A1    May 1, 2008

(51) Int. Cl.
*H03M 13/00* (2006.01)
(52) U.S. Cl. .................. 714/752; 714/749; 714/762
(58) Field of Classification Search ........... 714/752, 714/748, 749, 755, 762, 786, 788
See application file for complete search history.

(56) References Cited

U.S. PATENT DOCUMENTS

| 6,208,663 | B1 | 3/2001 | Schramm et al. |
| 6,704,898 | B1 | 3/2004 | Furuskar et al. |
| 7,644,340 | B1 * | 1/2010 | Liu ................................ 714/762 |
| 7,861,131 | B1 * | 12/2010 | Xu et al. ........................ 714/752 |
| 7,886,201 | B2 * | 2/2011 | Shi et al. ......................... 714/52 |
| 2001/0052091 | A1 | 12/2001 | Goldsack et al. |
| 2001/0056560 | A1 | 12/2001 | Khan et al. |
| 2003/0185181 | A1 | 10/2003 | Balachandran et al. |

FOREIGN PATENT DOCUMENTS

| CN | 1332917 | 1/2002 |
| CN | 2005800466496 | 1/2005 |

(Continued)

OTHER PUBLICATIONS

"United Kingdom Application Serial No. 0714909.9 , Office Action mailed Jun. 8, 2009", 1 pg.

(Continued)

*Primary Examiner* — Fritz Alphonse
(74) *Attorney, Agent, or Firm* — Schwegman, Lundberg & Woessner, P.A.

(57) ABSTRACT

In an embodiment, a source device encodes source information corresponding to a frame, assembles an initial data frame that includes the encoded data blocks, and transmits the initial data frame to a destination device. The destination device decodes the encoded data blocks and assembles a restored version of the initial data frame. The destination device identifies corrupted data blocks and uncorrupted data blocks within the restored version, stores the uncorrupted data blocks, generates a message that identifies the corrupted data blocks, and transmits the message to the source device. In response, the source device encodes source information corresponding to the corrupted data blocks identified in the message, assembles a responsive data frame, and transmits the responsive data frame to the destination device. The destination device produces a corrected data frame from the retransmitted data blocks and the previously-stored uncorrupted data blocks.

30 Claims, 6 Drawing Sheets

FOREIGN PATENT DOCUMENTS

| EP | 0938207 A2 | 8/1999 |
|---|---|---|
| EP | 1548989 | 6/2005 |
| WO | WO-2006078183 A1 | 7/2006 |

OTHER PUBLICATIONS

United Kingdom Application Serial No. 0714909.9, Office Action mailed Oct. 30, 2008, 3 pgs.

Kim, Y., et al., An Adaptive Hybrid ARQ Scheme Using Shortened Codes, *PCS Business Development Division, Korea Mobile Telecom*, (May 1996).

"United Kingdom Application Serial No. 0714909.9 , Office Action mailed Mar. 23, 2009", 3 pgs.

"International Search Report for Application No. PCT/RU2005/000016, date mailed Dec. 2, 2005," 6 pgs.

"Written Opinion of the International Search Authority for Application No. PCT/RU2005/000016, date mailed Dec. 2, 2005," 5 pgs.

"Chinese Application Serial No. 200580046649.6, Office Action mailed Dec. 21, 2010", 10 pgs.

Kim, Youngsup, et al., "An adaptive hybrid ARQ scheme using shortened codes", Global Telecommunications Conference, 1996. GLOBECOM '96. Communications: The Key to Global Prosperity, vol. 3, (Nov. 18-22, 1996), 2157-2161.

"Chinese Application No. 200580046649.6 Office Action mailed Dec. 18, 2009" 14 pgs.

"ETSI TS 101 350 V8.3.0", Global System for Mobile Communications, Technical Specification, Digital cellular communications system (Phase 2+); General Packet Radio Service (GPRS) Overall description of the GPRS radio interface; Stage 2, (1999), 1 pg.

"German Application Serial No. 112005003401.1, Office Action mailed Jun. 12, 2012", w/English Translation, 16 pgs.

\* cited by examiner

DATA COMMUNICATIONS METHODS AND APPARATUS

TECHNICAL FIELD

Various embodiments described herein relate to communications generally, including apparatus, systems, and methods used to transmit and receive information via wireless networks and other communication channels.

BACKGROUND

In a digital communications system, a source device may send information to a destination device according to a frame-based data transmission protocol. Because the communication channel may be noisy and unreliable, the data transmission protocol may implement a frame exchange protocol to allow the source device to determine whether a sent frame has been successfully received at the destination device. The protocol may include two frames: 1) a sent frame that includes a frame sent from the source device to the destination device; and 2) a response frame that includes an acknowledgment (ACK) from the destination device that the sent frame was received correctly.

To enable the destination device to determine whether a frame is received correctly, the source device may encode and send a frame check sequence, and possibly a header check sequence, along with the sent frame. If the destination device's evaluation of the frame check sequence and the header check sequence indicates that the sent frame was received correctly, then the destination device may send an ACK frame to the source device. If the evaluation indicates that sent frame was received with errors, then the destination device may refrain from sending the ACK frame. In this case, upon the expiration of an acknowledgment timer, the source device may retransmit the entire sent frame to the destination device. This retransmission method may result in more robust communications. However, for severely compromised channels, retransmissions also may consume significant amounts of system bandwidth, particularly for communications that include relatively large frames.

DETAILED DESCRIPTION

Various embodiments of the inventive subject matter, described below, include apparatus and ways of communicating data frames in a robust manner. Various embodiments may be implemented in systems and devices such as the system and device described in conjunction with FIGS. 1 and 2. Various embodiments also can be implemented in other systems and devices, which have different configurations, as will be apparent to those of skill in the art, based on the description herein.

Figure 1:
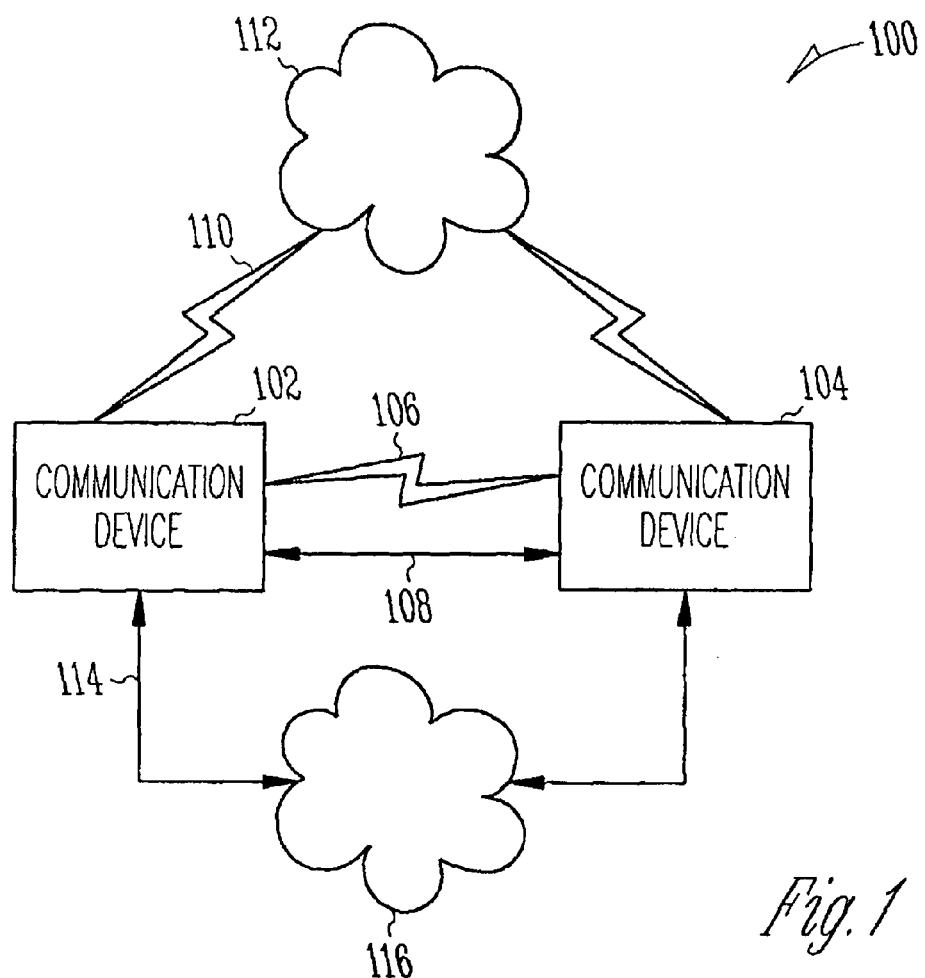
FIG. 1 is a simplified block diagram of a communication system, in accordance with an example embodiment.

FIG. 1 is a simplified block diagram of a communication system 100, in accordance with an example embodiment. System 100 includes multiple communication devices 102, 104. Although only two devices 102, 104 are illustrated for purposes of simplicity, system 100 may include many communication devices.

A device 102, 104 may be mobile, portable or stationary. For example, a device 102, 104 may include a laptop computer, a desktop computer, a server, a mainframe computer, a cellular telephone, a personal data assistant (PDA), a printer, a wireless computer peripheral (e.g., a keyboard, pointing device, etc.), a handheld radio, an intermediate communications device (e.g., a router, access point, etc.), a consumer electronics device (e.g., a television, game system, game system peripheral, etc.) or any other electronic device with the capability of communicating using a frame-based communication protocol.

Devices 102, 104 may communicate with each other directly, such as through a direct wireless link 106 or wired link 108. Alternatively or in addition, devices 102, 104 may communicate with each other indirectly through a wireless network 112 or a wired network 116, via wireless links 110 or wired links 114, respectively. For example, but not by way of limitation, networks 112, 116 may include a local area network (LAN), a wide area network (WAN), a wireless LAN (WLAN), a radio area network (RAN), a personal area network (PAN) (e.g., a Bluetooth network), a cellular network, a satellite network, or any combination thereof. For example, but not by way of limitation, embodiments may be implemented in any WLAN system or device that supports an Institute of Electrical and Electronics Engineers (IEEE) 802.x Standard (e.g., IEEE Std 802.11-1997, 802.11a, 802.11e, 802.15, 802.16, 802.3, etc.).

Devices 102, 104 may communicate with each other or with networks 112, 116 over unidirectional or bi-directional links. Accordingly, each device 102, 104 may be adapted to operate as a source device, a destination device, or both.

Figure 2:
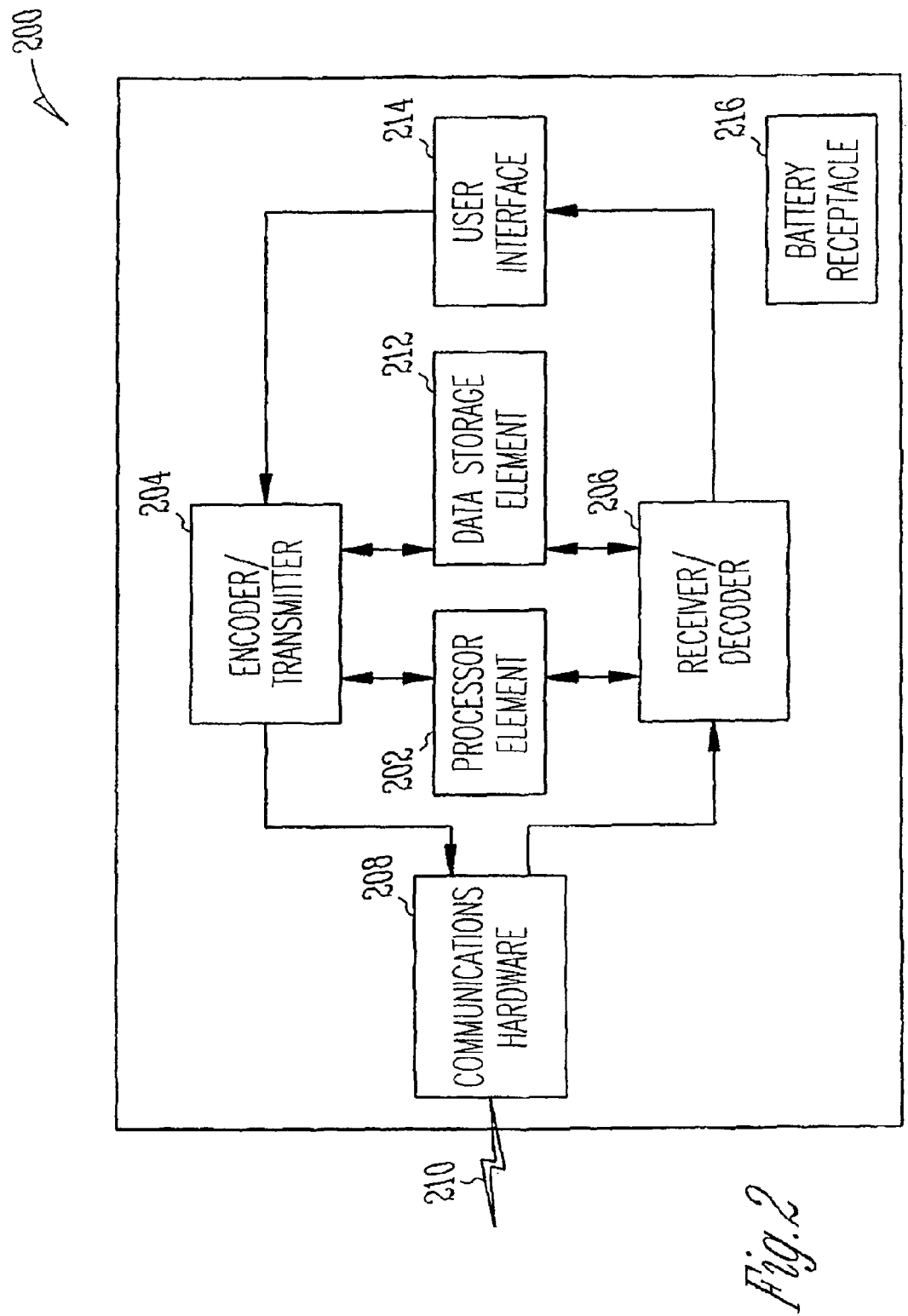
FIG. 2 is a simplified block diagram of a communication device, which includes an encoder/transmitter and a receiver/decoder, in accordance with an example embodiment.

FIG. 2 is a simplified block diagram of a communication device 200, in accordance with an example embodiment. Device 200 includes at least one processor element 202, encoder/transmitter 204, and receiver/decoder 206. Processor element 202 may include one or more general-purpose or special-purpose processors, application specific integrated circuits (ASICs), other discrete or integrated circuits, or combinations thereof. Processor element 202 may perform any of a number of functions, including but not limited to, data processing (e.g., creating, consuming, or otherwise processing data), voice processing, communications control functions, and device control functions, among other things.

Because device 200 includes both an encoder/transmitter 204 and a receiver/decoder 206, device 200 may support bi-directional communications. In other embodiments, device 200 may include only an encoder/transmitter or a receiver/decoder, but not both. In such embodiments, device 200 may operate as a source device or a destination device, respectively, but may not support bidirectional communications.

In an embodiment, device 200 also includes communications hardware 208, which enables device 200 to send and receive data frames over one or more communications links

210. In a particular embodiment, communications hardware 208 includes one or more antennas (e.g., a dipole, patch, omni-directional or other type of antenna), which enables communications over a wireless link 210 (e.g., over an air interface). When an infrared specification is implemented, communications hardware 208 may include one or more light-emitting diodes (LEDs) (not shown) or other optical transmission device. In alternate embodiments, communications hardware 208 may provide access to a wired link (not illustrated).

Device 200 further may include one or more data storage elements 212, which may be accessible to processor element 202, encoder/transmitter 204 and/or receiver/decoder 206. Data storage elements 212 may include, for example, one or more volatile or non-volatile storage media, including read only memory (ROM), random access memory (RAM), hard disk, removable storage media (e.g., CD ROM, digital video disk, floppy disk), magnetic cassettes, memory cards or sticks, other storage media, or combinations thereof. Data storage elements 212 may permanently or temporarily store, for example, data and computer-executable instructions, among other things.

In an embodiment, device 200 also may include one or more user interfaces 214. For example, but not by way of limitation, a user interface 214 may include a keyboard, keypad, pointing or selection device, speaker, microphone, display device, or combinations thereof. Further, device 200 also may include one or more battery receptacles 216. Accordingly, with a properly-charged battery installed, device 200 may operate without access to a continuous source of power (e.g., in the case of a portable electronic device), or may operate when an interruption occurs to a continuous source of power. In various alternate embodiments, device 200 may include additional or different elements than those illustrated in FIG. 2, and/or the elements may be differently arranged.

Figure 3:
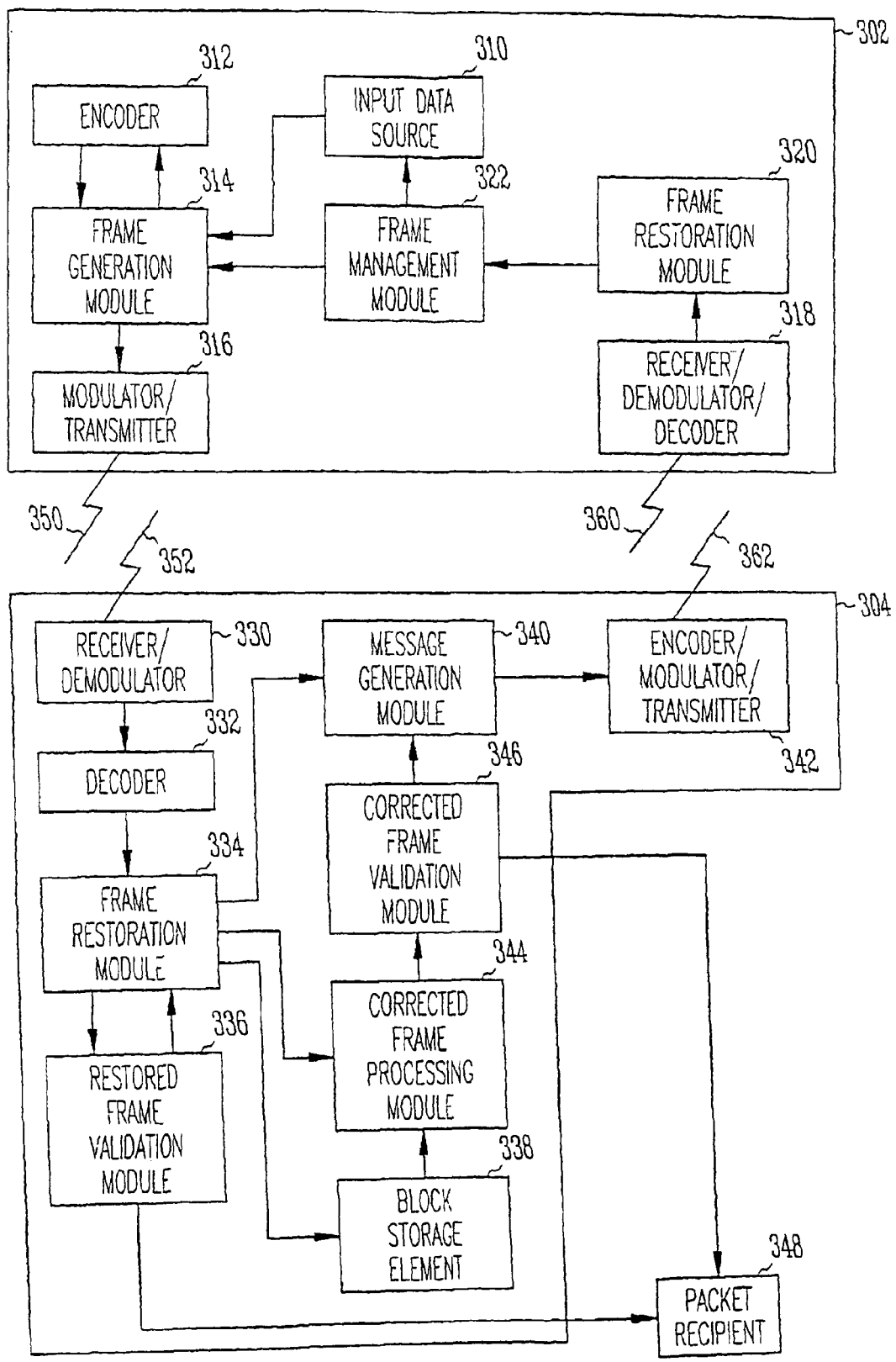
FIG. 3 is a simplified block diagram showing functional elements of a source device and a destination device, in accordance with an example embodiment.

FIG. 3 is a simplified block diagram showing functional elements of a source device 302 and a destination device 304, in accordance with an example embodiment. As mentioned previously, a particular device may be adapted to operate as both a source device and a destination device. However, for clarity of explanation, the functionalities of a source device and a destination device have been divided, in FIG. 3, into separate devices 302, 304.

Apparatus elements and processes according to various embodiments of the inventive subject matter include: 1) a source device sending an initial data frame, which includes multiple blocks, over a communications channel to a destination device; 2) the destination device restoring the received frame and identifying corrupted blocks within the restored frame; 3) the destination device sending a message to the source device, which identifies the corrupted blocks; 4) the source device sending a responsive data frame to the destination device, which includes one or more retransmitted data blocks corresponding to the one or more corrupted data blocks; and 5) the destination device producing a corrected data frame from the one or more retransmitted data blocks and previously-sent, uncorrupted data blocks. As will be apparent, based on the description herein, implementation of various embodiments may enable corrupted data blocks to be retransmitted, rather than retransmitting entire frames. Accordingly, robust communications may be achieved while conserving bandwidth used for retransmitting corrupted information.

To facilitate understanding of processing flows according to various embodiments, the description of FIG. 3, below, begins with a description of a source device 302, proceeds to a description of a destination device 304, returns to a further description of the source device 302, and then returns to a further description of the destination device 304.

In an embodiment, source device 302 includes an input data source 310, an encoder 312, a frame generation module 314, a modulator/transmitter 316, a receiver/demodulator/decoder 318, a frame restoration module 320, and a frame management module 322.

Input data source 310 may include, for example, one or more addressable data storage elements within which source information is stored. The ultimate source of data may be a higher level protocol implemented within the source device, or may be some other local or remote source of data. In response to one or more data selection commands, which identify specific data to be included within a frame, input data source 310 may provide source information to frame generation module 314. In an embodiment, the data selection commands may be provided by frame management module 322, described later, or by another module.

The source information for a particular frame is received by frame generation module 314. In an embodiment, frame generation module 314 is to assemble, for transmission to a destination device, an initial data frame. The initial data frame includes a plurality of encoded data blocks and a frame header. In an embodiment, the frame header may be received from frame management module 322, described later, or from another module.

In an embodiment, frame generation module 314 calculates a checksum value for the source information received for the frame, which is referred to herein as a data checksum value. In a further embodiment, frame generation module 314 calculates a checksum value for the header, which is referred to as a header checksum value. In alternate embodiments, either or both the header checksum calculation or the data checksum calculation may be excluded.

Encoder 312 receives the source information from frame management module 322 (or from input data source 310) and the data checksum value, and encodes the source information and data checksum value, resulting in a plurality of encoded data blocks. In addition, in an embodiment, encoder 312 receives and encodes the header and header checksum value.

In an embodiment, encoder 312 implements a block code encoding technique to encode data (also referred to herein as "block encoding"). For example, but not by way of limitation, the block encoding technique may include a low density parity check (LDPC) encoding technique. Other block encoding techniques may be used in other embodiments. In order to provide an additional mechanism to check for errors and, in some cases, to correct errors, block encoding introduces redundancy to a block of data. Block encoding performed on a block of data produces a "codeword" or "encoded data block." Because of the added redundancy, block encoded data block may include more bits than the input block of data from which the encoded data block was produced.

Figure 4:
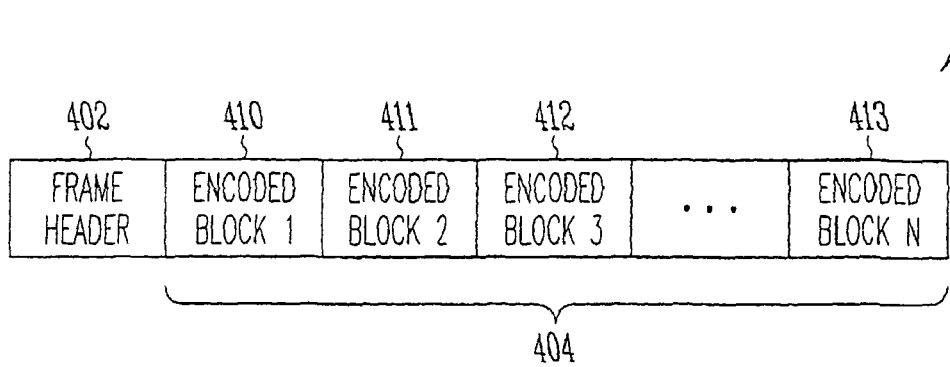
FIG. 4 is a diagram illustrating an initial data frame, in accordance with an example embodiment.

Encoder 312 provides the plurality of encoded data blocks to frame generation module 314, which then assembles the initial data frame. FIG. 4 is a diagram illustrating an initial data frame 400, in accordance with an example embodiment. As used herein, a "frame" means a data unit that includes a frame header 402 and a frame body 404, in an embodiment. Frame body 404 may be a variable-length or fixed-length field, and may include one or more encoded blocks 410, 411, 412, 413. Further, each block may include from one to many bytes of data. For example, a frame body may include 28 blocks, where each block may include 56 bytes. The example numbers given are arbitrary, and a frame body may include more or fewer blocks, and a block may include more or fewer bytes. Further, some or all blocks within a frame may include different numbers of bytes.

In a further embodiment, a frame 400 may also include a frame check sequence and/or a header check sequence (not illustrated). In an embodiment, the frame check sequence and the header check sequence may contain the result of applying mathematical algorithms (e.g., a CCITT CRC-16 or CRC-32 polynomial) to the frame body 404 and the frame header 402, respectively. In an embodiment, the frame check sequence is encoded with the frame data (e.g., last block 413, or with another block), and the header check sequence is encoded with the frame header (e.g., header 402).

In a further embodiment, frame 400 may be a medium access control (MAC) protocol data unit, or MPDU, as defined in a standard specification, such as an IEEE Std. 802.11 specification, for example. In such an embodiment, the MPDU may include a MAC header (e.g., header 402), a frame body (e.g., body 404), and an FCS. The frame body, in turn, may include one or more encoded blocks containing MAC service data units (MSDUs) or protocol service data units (PSDUs) from higher layer protocols.

Referring back to FIG. 3, frame generation module 314 produces a digital representation of the initial data frame. The initial data frame may or may not be encrypted, prior to transmission. For example, but not by way of limitation, a frame may be encrypted using a Wired Equivalent Privacy (WEP) algorithm, or another type of encryption algorithm.

Modulator/transmitter 316 receives the initial data frame, modulates the frame, and transmits the frame over a communications link 350 (e.g., a wired or wireless link). Accordingly, the initial data frame may also be referred to herein as the initial sent data frame.

Modulator/transmitter 316 may include one or more filters, a modulator, and other apparatus for implementing the particular physical layer specifications supported by the source device 302. Further, in an embodiment in which source device 302 is a wireless device, modulator/transmitter 316 may include one or more antennas (e.g., dipole, patch, omni-directional, or other types of antennas, not illustrated) for transmitting the modulated frames over the air interface. In other embodiments in which source device 302 communicates over wired connections, modulator/transmitter 316 may include a network interface suitable to placing information on the wired network.

In an embodiment, destination device 304 includes a receiver/demodulator 330, a decoder 332, a frame restoration module 334, a restored frame validation module 336, a block storage element 338, a message generation module 340, an encoder/modulator/transmitter 342, a corrected frame processing module 344, and a corrected frame validation module 346.

Receiver/demodulator 330 receives information from communications link 352. In an embodiment, the information that receiver/demodulator 330 receives over link 352 may include the header and the encoded data blocks associated with the initial sent data frame provided by source device 302.

Link 352 may be the same link as link 350. In other words, a direct connection may exist between the source device 302 and the destination device 304. However, it is to be further understood that, although only links 350, 352 are illustrated between modulator/transmitter 316 and destination device 304, in alternative embodiments, one or more networks and/or intermediate devices may exist between source device 302 and destination device 304.

Receiver/demodulator 330 may include one or more filters, a de-modulator, a timing clock recovery device, and other apparatus for implementing the particular physical layer specifications supported by the destination device 304. Further, in an embodiment in which destination device 304 is a wireless device, receiver/demodulator 330 may include one or more antennas (e.g., dipole, patch, omni-directional, or other types of antennas, not illustrated) for receiving the modulated frames from the air interface. In other embodiments in which destination device 304 communicates over wired connections, modulator/transmitter 330 may include a network interface suitable to receiving information from the wired network.

Receiver/demodulator 330 provides demodulated, encoded data blocks to decoder 332. Decoder 332 is to decode the encoded data blocks, resulting in a plurality of decoded data blocks. In an embodiment, decoder 332 implements block decoding technique (e.g., LDPC decoding) to decode data.

When signals arising from transmitted, encoded data blocks are received and processed, the redundant information included in the encoded data blocks may be used to identify and/or correct errors in or remove distortion, collectively referred to as "syndromes," from the received signals in order to recover the original, input blocks of data. In an embodiment, this error checking and/or correcting may be implemented by decoder 332 during the decoding process. In the absence of errors, or in the case of correctable errors or distortion, decoding may be used to recover the original, input blocks of data, which were encoded by encoder 312. In the case of uncorrectable errors or distortion in a received data block, decoder 332 may produce an indication that the original data for that data block cannot be fully recovered. In an embodiment, this indication, referred to herein as a "corrupted block indication," may be used to initiate retransmission of the original, input data block corresponding to the unrecoverable data block, as will be explained in more detail below.

Decoder 332 provides the plurality of decoded data blocks and the corrupted block indications, if any, to frame restoration module 334. Frame restoration module 334 is to assemble, from the plurality of decoded data blocks, a restored version of the initial data frame.

In an embodiment, frame restoration module 334 provides the restored version of the initial data frame to restored frame validation module 336. Restored frame validation module 336 is to perform a validation procedure on the restored version of the initial data frame. In an embodiment, the validation procedure includes calculating a new frame check sequence for the restored data blocks, and comparing the new value with the received frame check sequence in the restored version of the initial data frame (i.e., which value, if uncorrupted, should equal the frame check sequence calculated by the source device and sent along with the initial data frame). A similar validation procedure may be performed for the header, using the header check sequence. In an embodiment, when the validation procedure is successful, then the restored version is to be delivered to a frame recipient 348. In an embodiment, the frame recipient 330 may be an element of the destination device 304, or may form a portion of a separate electronic device.

When the validation procedure is not successful, then restored frame validation module 336 indicates the invalid result, in an embodiment. In an embodiment, frame restoration module 334 is to receive the invalid result indication, and to initiate a block error identification procedure, in response. In another embodiment, a different module may initiate a block error identification procedure when the validation procedure is not successful. In still another embodiment, a block error identification procedure may be implemented regardless of the outcome of the validation procedure (e.g., the error detection and validation procedures may be performed in parallel).

In an embodiment, frame restoration module 334 is to perform a block error identification procedure to identify uncorrupted data blocks and corrupted data blocks within the restored version. In an embodiment, frame restoration module 334 identifies corrupted data blocks based on the corrupted block indications received from decoder 332. In an alternate embodiment, frame restoration module 334 identifies corrupted data blocks based on an evaluation of the data checksum value associated with the received information in the frame body.

In an embodiment, uncorrupted blocks are sent to block storage element 338. Block storage element 338 is to store uncorrupted data blocks identified within the restored version of the initial data frame. Additionally, in an embodiment, the initial data frame header, header check sequence, and frame check sequence value are stored in block storage element.

Corrupted blocks, or identifications of the corrupted blocks, are sent to message generation module 340. Message generation module 340 is to generate, for transmission to the source device 302, at least one message identifying the corrupted data blocks (i.e., which identifies a subset of the plurality of decoded data blocks from the restored initial data frame). In an embodiment, a single message is generated by message generation module 340 to identify the corrupted data blocks in a received and restored frame. Although this embodiment is described herein, it is to be understood that, in other embodiments, more than one message may be generated to identify the corrupted data blocks within a restored initial data frame.

Figure 5:
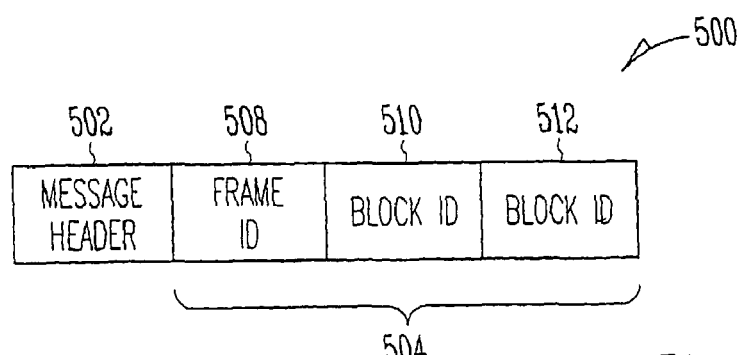
FIG. 5 is a diagram illustrating a corrupted block identification message, in accordance with an example embodiment.

FIG. 5 is a diagram illustrating a corrupted block identification message 500, in accordance with an example embodiment. In an embodiment, a corrupted block identification message includes a message header 502 and a message body 504. Message body 504 may include a frame identification (ID) field 508 and one or more block identifications 510, 512, indicating those blocks that were determined to be corrupted. In a further embodiment, message 500 may also include a message body check sequence and/or a message header check sequence, encoded with the message body 504 and header 502, respectively, to enable the source device 302 to perform validation procedures on the message body 504 and header 502.

Frame identification field 508 may include a value, which enables the source device 302 to determine which previously-sent frame the corrupted block identifiers correspond to. For example, but not by way of limitation, frame identification field 508 may include the sequence number associated with the frame (e.g., a sequence number received in the frame header). In addition, if the frame was sent in fragments, frame identification field 508 may additionally include the fragment number.

Block identifications 510, 512 may include the block numbers, within the restored initial data frame, corresponding to the corrupted blocks. For example, referring back to FIG. 4, when destination device 304 determines that blocks 410 and 412 are corrupted, block identifications 510, 512 may include the values 1 and 3, indicating that the first and third blocks are corrupted. Although only two block identifications 510, 512 are illustrated in FIG. 5, more or fewer block identifications may be included in message 500, according to how many blocks were determined to be corrupted.

Referring back to FIG. 3, message generation module 340 provides a corrupted block identification message to encoder/modulator/transmitter 342. Encoder/modulator/transmitter 342 then encodes, modulates, and transmits the message over a link 360. For purposes of simplicity, encoder/modulator/transmitter 342 are shown as a single module. It is to be understood that encoding, modulating, and transmitting may be carried out by distinct modules.

Referring again to source device 302, receiver/demodulator/decoder 318 receives the information corresponding to the corrupted block identification message from communications link 362. Link 362 may be the same or different from link 360, as previously explained in conjunction with links 350, 352. Receiver/demodulator/decoder 318 then demodulates and decodes the information, in an embodiment.

The decoded information is received by frame restoration module 320, in an embodiment, which is to restore the corrupted block identification message. In an embodiment, the message additionally may be validated.

The corrupted block identification message is sent to frame management module 322, which is to process the message. In an embodiment, frame management module 322 identifies the previously-sent source information, based on the frame identification and the one or more block identifications included within the message. In an embodiment, frame management module 322 provides a data selection command to input data source 310, which indicates the data associated with the frame and block identifications. Input data source 310, in turn, provides the selected source information to frame generation module 314.

Frame generation module 314 may calculate a data checksum value for the information, and provide the information and the checksum (if calculated) to encoder 312. In an embodiment, encoder 312 encodes the information, and provides the encoded data blocks to frame generation module 314. These data blocks may be referred to as retransmitted data blocks. In an alternative embodiment, the source device may have previously stored encoded versions of the data blocks, and may retrieve the encoded versions, rather than encoding them again. Frame generation module 314 is to assemble a responsive data frame for transmission to the destination device 304.

Figure 6:
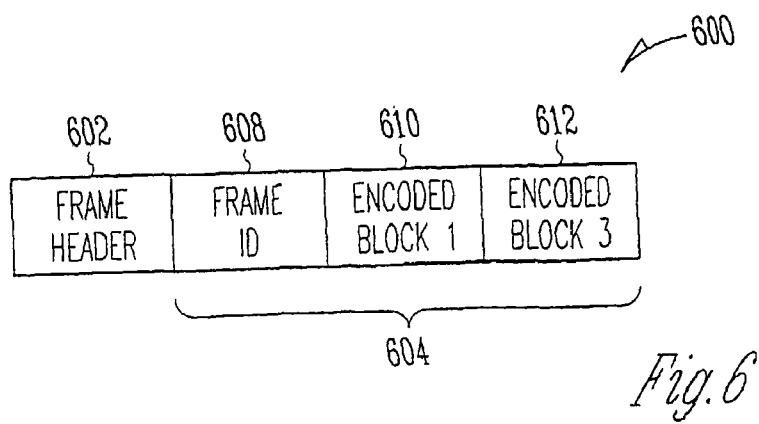
FIG. 6 is a diagram illustrating a responsive data frame, in accordance with an example embodiment.

FIG. 6 is a diagram illustrating a responsive data frame 600, in accordance with an example embodiment. Responsive data frame 600 includes a frame header 602 and a frame body 604, in an embodiment. In addition, a responsive data frame 600 may also include a frame check sequence and/or a header check sequence, encoded with the frame body 604 and frame header 602, respectively, to enable the destination device to validate the frame body 604 and/or the frame header 602 of the responsive data frame 600.

Frame header 602 may include an indication that the responsive data frame 600 includes retransmitted data blocks. This indication may be inherent, for example, in a message-type field (e.g., a frame control field) included within frame header 602.

Frame body 604 includes an initial data frame identification field 608 and one or more encoded blocks 610, 612, in an embodiment. Initial data frame identification field 608 may include a value to enable the destination device 304 to correlate the retransmitted blocks with previously-stored, uncorrupted data blocks (e.g., blocks stored in block storage element 338, FIG. 3). For example, the initial data frame identification field 608 may include the sequence number of the previously-sent initial data frame. Encoded blocks 610, 612 correspond to the data blocks that were identified as being corrupted in the corrupted block identification message, in an embodiment. Although only two encoded blocks 610, 612 are illustrated, frame body 604 may include more or fewer blocks.

Referring back to FIG. 3, frame generation module 314 produces a digital representation of the responsive data frame. The responsive data frame may or may not be encrypted, prior to transmission. Modulator/transmitter 316 receives the responsive data frame, modulates the frame, and transmits the frame over a communications link 350.

Referring again to destination device 304, receiver/demodulator 330 receives information from communications link 352. In an embodiment, the information that receiver/demodulator 330 receives over link 352 may include the header and encoded data blocks associated with the responsive data frame provided by source device 302.

Receiver/demodulator 330 provides demodulated, encoded data blocks to decoder 332. Decoder 332 is to decode the encoded data blocks, resulting in one or more decoded, retransmitted data blocks. Decoder 332 provides the one or more decoded, retransmitted data blocks to frame restoration module 334, in an embodiment. Frame restoration module 334 is to assemble a restored version of the responsive data frame.

In an embodiment, frame restoration module 334 may provide the restored version of the responsive data frame to corrected frame processing module 344. Corrected frame processing module 344 is to produce a corrected data frame. In an embodiment, corrected frame processing module 344 identifies the previously-received, initial data frame based on the information in the initial data frame identification field (e.g., field 608, FIG. 6), and retrieves previously-stored, uncorrupted data blocks, if any, which correspond to the previously-received, initial data frame. In addition, in an embodiment, corrected frame processing module 344 retrieves the previously-stored header, header check sequence, and frame check sequence for the previously-received, initial data frame. Corrected frame processing module 344 then assembles a corrected frame from the header, the header check sequence, the frame check sequence, the uncorrupted data blocks, and the one or more retransmitted data blocks.

In an embodiment, corrected frame processing module 344 sends the corrected frame to corrected frame validation module 346, for validation. In an alternative embodiment, corrected frame processing module 344 sends the corrected frame to restored frame validation module 336. When the validation procedure is not successful, then in one embodiment, the destination device 304 generates and sends a frame retransmission request to the source device 302. In response, the source device 302 may retransmit the entire frame. In another embodiment, rather than sending a frame retransmission request, then the corrected frame may be processed by the frame restoration module 334, which once again may detect corrupted blocks, store uncorrupted blocks, send another corrupted block identification message to the source device 302, and the entire process may iterate. When the validation procedure is successful, then the corrected frame is to be delivered to frame recipient 348. The destination device 304 may also send a frame acknowledgement message to the source device 302, indicating that the frame was received without errors.

It is to be understood that the modules and elements illustrated in FIG. 3 are included to facilitate explanation of various embodiments, and accordingly FIG. 3 intentionally excludes depictions of elements relating to other functions that may be performed by devices 302, 304 (e.g., voice or data processing functions, user interface functions, etc.). In addition, although various modules and elements are shown as distinct from each other in FIG. 3, it is to be understood that some of these modules and elements may be performed by common hardware (e.g., processors, ASICs, etc.). Further, although specific modules and elements are illustrated in FIG. 3, source device 302 and/or destination device 304 may include more, fewer, or different modules and elements, in other embodiments, and/or the modules and elements may be differently arranged and combined to produce substantially similar results.

Figure 7:
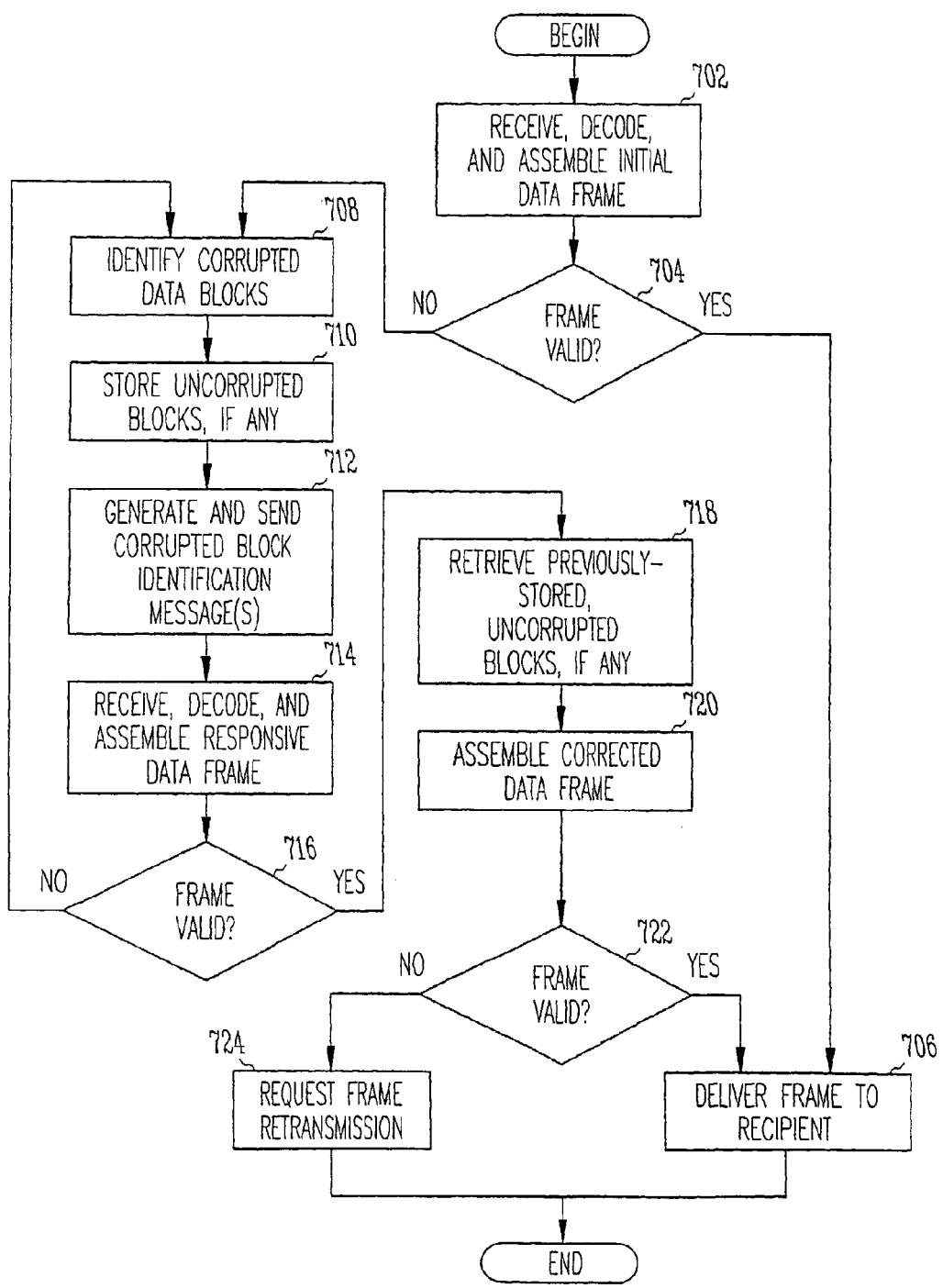
FIG. 7 is a flowchart of a method for a destination device to correct a data frame, in accordance with an example embodiment.
Figure 8:
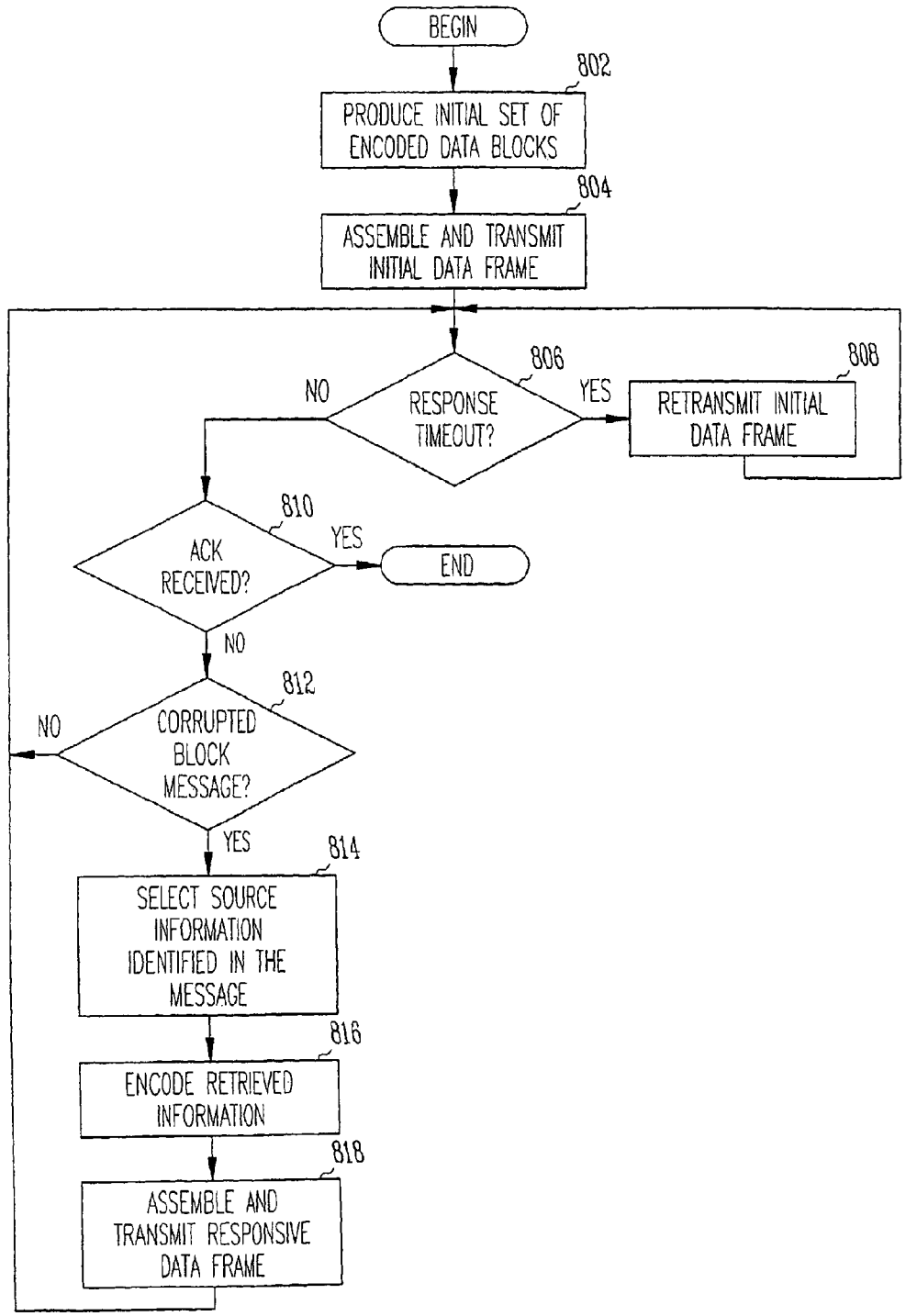
FIG. 8 is a flowchart of a method for a source device to selectively retransmit identified data blocks, in accordance with an example embodiment.

FIGS. 7 and 8 include flowcharts of methods performed by a destination device (e.g., device 304, FIG. 3) and a source device (e.g., device 302, FIG. 3), respectively. More particularly, FIG. 7 is a flowchart of a method for a destination device to correct a data frame, in accordance with an example embodiment.

The method begins, in block 702, when a destination device receives, from a source device, signals corresponding to a frame of encoded data blocks received over a communications channel. Upon receipt, the device decodes the encoded data blocks, resulting in a plurality of decoded data blocks. In an embodiment, the decoding process may produce one or more indications of corrupted data blocks. From the plurality of decoded data blocks, the device assembles a restored version of an initial data frame.

In block 704, a validation procedure is performed. In an embodiment, this includes calculating a frame check sequence for the frame body of the restored version of the initial data frame, and comparing the calculated frame check sequence with a received frame check sequence for the frame. A similar validation procedure may be performed for the header, using the header check sequence. If the frame is determined to be valid, then it is delivered to the frame recipient, in block 706, and the method ends.

If the frame is determined to be not valid, then in block 708, corrupted data blocks are identified within the restored version. In an embodiment, the corrupted data blocks are identified as the data blocks corresponding to the one or more indications of corrupted data blocks, which indications were produced during the decoding process.

In block 710, uncorrupted data blocks, if any, are stored. In addition, in an embodiment, the header, header check sequence, and frame check sequence from the restored version of the initial data frame are also stored, for subsequent use.

In block 712, at least one corrupted block identification message is generated and sent to the source device. The message identifies a subset of the plurality of decoded data blocks, where the subset corresponds to the corrupted data blocks identified in block 708. In an embodiment, identification of the subset of corrupted data blocks is identified by including, in the message, a frame sequence value and the block numbers for the corrupted data blocks.

In block 710, the destination device receives, from the source device, information corresponding to a responsive data frame. The information is decoded, and the responsive data frame is assembled. In an embodiment, the responsive data frame includes one or more retransmitted data blocks (i.e., those blocks that correspond to the identified corrupted blocks). In an embodiment, a validation procedure is performed for the responsive data frame. In block 716, if it is determined that the responsive data frame is not valid, then the procedure may iterate, by identifying corrupted data blocks (block 708), storing uncorrupted data blocks (block 710), generating and sending corrupted block identification messages (block 712), and so on. This process may be repeatable for a finite number of iterations before a request for the entire frame is sent, or the frame is dropped.

In block 716, if it is determined that the responsive data frame is valid, then previously-stored, uncorrupted blocks are retrieved, if any had been stored, in block 718. In an embodiment, the previously-stored header, header check sequence, and frame check sequence also may be retrieved.

A corrected frame is then produced, in block 720, by assembling the retrieved header, header check sequence, frame check sequence, uncorrupted blocks, and the retransmitted blocks. In an embodiment, a validation procedure is performed for the corrected frame. In block 722, if it is determined that the corrected frame is valid, then the corrected frame may be delivered to the frame recipient, in block 706, and the method ends.

If it is determined, in block 722, that the corrected frame is not valid, then the destination device generates and sends a request for frame retransmission, in block 724, and the method ends. In an alternative embodiment, the destination device may determine corrupted blocks within the corrected frame, and may repeat the processes of identifying corrupted data blocks (block 708), storing uncorrupted data blocks (block 710), generating and sending corrupted block identification messages (block 712), and so on. This process may be repeatable for a finite number of iterations before a request for the entire frame is sent, or the frame is dropped.

FIG. 8 is a flowchart of a method for a source device (e.g., device 302, FIG. 3) to selectively retransmit identified data blocks, in accordance with an example embodiment. In an embodiment, the method begins, in block 802, by the source device selecting source information corresponding to a frame from an input data source, and producing a plurality of encoded data blocks. In an embodiment, encoding includes applying a block encoding technique to the source information. In other embodiments, other encoding techniques may be used.

In block 804, the source device assembles an initial data frame, which may include a header and the encoded data blocks, in an embodiment. The initial data frame is then modulated and transmitted to the destination device. The source device may then wait for a response from the destination device.

In an embodiment, a determination is made, in block 806, whether a response timeout period has expired. If so, then the source device retransmits the initial data frame, in block 808, and the method iterates as shown. If not, then a determination is made, in block 810, whether a frame acknowledgement message has been received, indicating that the frame was received without errors. If so, the method ends.

If a frame acknowledgement message has not been received prior to the timeout, then a further determination is made, in block 812, whether a corrupted block identification message has been received. If not, then the method iterates as shown.

If a corrupted block identification message has been received, then in block 814, the source device processes the message. In an embodiment, this includes selecting a subset of the initial input information from the input data source, where the subset corresponds to the corrupted data blocks identified by the destination device in the corrupted block identification message. In block 816, the source device produces one or more encoded data blocks for retransmission, in an embodiment. These data blocks may be referred to as retransmitted data blocks. In an alternative embodiment, the source device may have previously stored encoded versions of the data blocks, and may retrieve the encoded versions, rather than encoding them again.

In block 818, the source device assembles a responsive data frame, which includes a header and the retransmitted data blocks, in an embodiment. The source device then modulates and transmits the responsive data frame, and the method iterates as shown in FIG. 8.

The operations described above, with respect to the methods illustrated and described herein, can be performed in different orders from those disclosed. Also, it will be understood that, although some methods are described as having an "end," they may be continuously performed.

Thus, various embodiments of methods, apparatus, and systems have been described which enable robust data communications, while conserving bandwidth. The foregoing description of specific embodiments reveals the general nature of the inventive subject matter sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the inventive subject matter embraces all such alternatives, modifications, equivalents and variations as fall within the spirit and broad scope of the appended claims.

The various procedures described herein can be implemented in hardware, firmware or software. A software implementation can use microcode, assembly language code, or a higher-level language code. The code may be stored on one or more volatile or non-volatile computer-readable media during execution or at other times. These computer-readable media may include hard disks, removable magnetic disks, removable optical disks, magnetic cassettes, memory cards or sticks, digital video disks, RAMs, ROMs, and the like.

In the foregoing description of various embodiments, reference is made to the accompanying drawings, which form a part hereof and show, by way of illustration, specific embodiments in which the inventive subject matter may be practiced. Various embodiments are described in sufficient detail to enable those skilled in the art to practice the inventive subject matter, and it is to be understood that other embodiments may be utilized, and that process or mechanical changes may be made, without departing from the scope of the inventive subject matter.

Such embodiments of the inventive subject matter may be referred to, individually and/or collectively, herein by the term "invention" merely for convenience and without intending to voluntarily limit the scope of this application to any single invention or inventive concept if more than one is, in fact, disclosed. It will be recognized that the methods of various embodiments can be combined in practice, either concurrently or in succession. Various permutations and combinations will be readily apparent to those skilled in the art.

What is claimed is:
1. An apparatus comprising:
a decoder to decode data blocks encoded for an initial data frame and received over a communications channel from a source device, resulting in a plurality of decoded data blocks;
a frame restoration module to assemble, from the plurality of decoded data blocks, a restored version of the initial data frame, and to identify corrupted data blocks within the restored version; and
a message generation module to generate, for transmission to the source device, at least one message which identi- fies a subset of the plurality of decoded data blocks, wherein the subset corresponds to the corrupted data blocks.

2. The apparatus of claim 1, further comprising:
a restored frame validation module to perform a validation procedure on the restored version of the initial data frame, wherein the restored version is to be delivered to a frame recipient when the validation procedure is successful.

3. The apparatus of claim 1, further comprising:
a block storage element to store uncorrupted data blocks identified within the restored version of the initial data frame; and
a corrected frame processing module to produce a corrected data frame from the uncorrupted data blocks and one or more retransmitted data blocks sent to the apparatus by the source device in response to the at least one message.

4. The apparatus of claim 3, further comprising:
a corrected frame validation module to perform a validation procedure on the corrected data frame, wherein the corrected data frame is to be delivered to a frame recipient when the validation procedure is successful.

5. The apparatus of claim 1, wherein the decoder includes a block code decoder.

6. An apparatus comprising:
an encoder to encode source information corresponding to a frame, resulting in a plurality of encoded data blocks;
a frame generation module to assemble, for transmission to a destination device, an initial data frame that includes the plurality of encoded data blocks; and
a frame management module to process at least one message received from the destination device, wherein the at least one message identifies a subset of the plurality of encoded data blocks, and wherein the subset corresponds to corrupted data blocks identified by the destination device from a restored version of the initial data frame, and
wherein the frame generation module is further to assemble a responsive data frame for transmission to the destination device, and wherein the responsive data frame includes one or more retransmitted data blocks corresponding to the one or more corrupted data blocks.

7. The apparatus of claim 6, wherein the frame management module is further to select information corresponding to the one or more retransmitted data blocks from an input data source.

8. The apparatus of claim 6, wherein the encoder includes a block code encoder.

9. An apparatus comprising:
a decoder to decode first data blocks encoded for a first initial data frame and received over a communications channel from a source device, resulting in a plurality of first decoded data blocks;
a frame restoration module to assemble, from the plurality of first decoded data blocks, a first restored version of the first initial data frame, and to identify first corrupted data blocks within the first restored version;
a message generation module to generate, for transmission to the source device, at least one first message which identifies a first subset of the plurality of first decoded data blocks, wherein the first subset corresponds to the first corrupted data blocks;
an encoder to encode source information corresponding to a second initial data frame, resulting in a plurality of second data blocks encoded for the second initial data frame;
a frame generation module to assemble, for transmission to a destination device, the second initial data frame that includes the plurality of second data blocks; and
a frame management module to process at least one second message received from the destination device, wherein the at least one second message identifies a second subset of the plurality of second data blocks, and wherein the second subset corresponds to second corrupted data blocks identified by the destination device from a second restored version of the second initial data frame, and
wherein the frame generation module is further to assemble a responsive data frame for transmission to the destination device, wherein the responsive data frame includes one or more retransmitted data blocks corresponding to the one or more second corrupted data blocks.

10. The apparatus of claim 9, further comprising:
a block storage element to store uncorrupted data blocks identified from the plurality of first decoded data blocks.

11. The apparatus of claim 10, wherein:
the decoder is further to decode one or more third encoded data blocks received from the source device, resulting in one or more third decoded data blocks; and
wherein the apparatus further comprises a corrected frame processing module to produce a corrected data frame from the one or more third data blocks and the uncorrupted data blocks.

12. A system comprising:
an omni-directional antenna to receive encoded data blocks over a communications channel from a source device;
a decoder, coupled to the omni-directional antenna, to decode the encoded data blocks, resulting in a plurality of decoded data blocks;
a frame restoration module to assemble, from the plurality of decoded data blocks, a restored version of an initial data frame, and to identify corrupted data blocks within the restored version; and
a message generation module to generate, for transmission to the source device, at least one message which identifies a subset of the plurality of decoded data blocks, wherein the subset corresponds to the corrupted data blocks.

13. The system of claim 12, further comprising:
a block storage element to store uncorrupted data blocks identified within the restored version of the initial data frame; and
a corrected frame processing module to produce a corrected data frame from the uncorrupted data blocks and one or more retransmitted data blocks sent to the apparatus by the source device in response to the at least one message.

14. The system of claim 13, further comprising:
a corrected frame validation module to perform a validation procedure on the corrected data frame, wherein the corrected data frame is to be delivered to a frame recipient when the validation procedure is successful.

15. A system comprising:
an encoder to encode source information corresponding to a frame, resulting in a plurality of first encoded data blocks;
a frame generation module to assemble an initial data frame that includes the plurality of encoded data blocks;
an omni-directional antenna to transmit the initial data frame over a communications channel to a destination device; and
a frame management module to process at least one message received from the destination device, wherein the at least one message identifies a subset of the plurality of encoded data blocks, and wherein the subset corresponds to corrupted data blocks identified by the destination device from a restored version of the initial data frame, and wherein the frame generation module is further to assemble a responsive data frame for transmission to the destination device, wherein the responsive data frame includes one or more retransmitted data blocks corresponding to the one or more corrupted data blocks.

16. The apparatus of claim 15, wherein the frame management module is further to select information corresponding to the one or more retransmitted data blocks from an input data source.

17. The apparatus of claim 15, wherein the encoder includes a block code encoder.

18. A method comprising:
decoding encoded data blocks received over a communications channel from a source device, resulting in a plurality of decoded data blocks;
assembling, from the plurality of decoded data blocks, a restored version of an initial data frame;
identifying corrupted data blocks within the restored version; and
generating, for transmission to the source device, at least one message which identifies a subset of the plurality of decoded data blocks, wherein the subset corresponds to the corrupted data blocks.

19. The method of claim 18, further comprising:
storing uncorrupted data blocks identified from the restored version.

20. The method of claim 19, further comprising:
producing a corrected data frame from the uncorrupted data blocks and one or more retransmitted data blocks sent by the source device in response to the at least one message.

21. The method of claim 18, wherein decoding comprises performing a block code decoding process.

22. A method to be performed by a processor element comprising:
encoding source information corresponding to a frame, resulting in a plurality of first encoded data blocks;
assembling, for transmission to a destination device, an initial data frame that includes the plurality of encoded data blocks;
processing at least one message received from the destination device, wherein the at least one message identifies a subset of the plurality of encoded data blocks, and wherein the subset corresponds to corrupted data blocks identified by the destination device from a restored version of the initial data frame; and
assembling a responsive data frame for transmission to the destination device, wherein the responsive data frame includes one or more retransmitted data blocks corresponding to the one or more corrupted data blocks.

23. The method of claim 22, further comprising:
selecting information corresponding to the one or more retransmitted data blocks from an input data source.

24. The method of claim 23, wherein encoding comprises performing a block code encoding process.

25. A computer-readable medium having program instructions stored thereon to perform a method, which when executed within an electronic device, result in:
decoding encoded data blocks received over a communications channel from a source device, resulting in a plurality of decoded data blocks;
assembling, from the plurality of decoded data blocks, a restored version of an initial data frame;
identifying corrupted data blocks within the restored version; and
generating, for transmission to the source device, at least one message which identifies a subset of the plurality of decoded data blocks, wherein the subset corresponds to the corrupted data blocks.

26. The computer-readable medium of claim 25, wherein execution of the method further results in:
storing uncorrupted data blocks identified from the restored version; and
producing a corrected data frame from the uncorrupted data blocks and one or more retransmitted data blocks sent by the source device in response to the at least one message.

27. The computer-readable medium of claim 25, wherein decoding comprises performing a block code decoding process.

28. A computer-readable medium having program instructions stored thereon to perform a method, which when executed within an electronic device, result in:
encoding source information corresponding to a frame, resulting in a plurality of first encoded data blocks;
assembling, for transmission to a destination device, an initial data frame that includes the plurality of encoded data blocks;
processing at least one message received from the destination device, wherein the at least one message identifies a subset of the plurality of encoded data blocks, and wherein the subset corresponds to corrupted data blocks identified by the destination device from a restored version of the initial data frame; and
assembling a responsive data frame for transmission to the destination device, wherein the responsive data frame includes one or more retransmitted data blocks corresponding to the one or more corrupted data blocks.

29. The computer-readable medium of claim 28, wherein execution of the method further results in:
selecting information corresponding to the one or more retransmitted data blocks from an input data source.

30. The computer-readable medium of claim 28, wherein encoding comprises performing a block code encoding process.

* * * * *

UNITED STATES PATENT AND TRADEMARK OFFICE
CERTIFICATE OF CORRECTION

PATENT NO.        : 8,359,513 B2
APPLICATION NO. : 11/814094
DATED             : January 22, 2013
INVENTOR(S)       : Lyakh et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1491 days.

Signed and Sealed this
First Day of September, 2015

Michelle K. Lee
*Director of the United States Patent and Trademark Office*